(12) United States Patent
Bischoff

(10) Patent No.: US 9,226,449 B2
(45) Date of Patent: Jan. 5, 2016

(54) METHOD FOR SETTING THE WORK PARAMETERS OF A HARVESTER

(71) Applicant: Deere & Company, Moline, IL (US)

(72) Inventor: Lutz Bischoff, Nuenschweiler (DE)

(73) Assignee: DEERE & COMPANY, One John Deere Place, Moline, IL (US)

( * ) Notice: Subject to any disclaimer, the term of this patent is extended or adjusted under 35 U.S.C. 154(b) by 0 days.

(21) Appl. No.: 14/169,644

(22) Filed: Jan. 31, 2014

(65) Prior Publication Data

US 2014/0215984 A1    Aug. 7, 2014

(30) Foreign Application Priority Data

Feb. 7, 2013   (DE) .......................... 10 2013 201 996

(51) Int. Cl.
| | | |
|---|---|---|
| A01D 75/00 | (2006.01) | |
| A01B 79/00 | (2006.01) | |
| A01D 41/127 | (2006.01) | |
| A01D 75/28 | (2006.01) | |

(52) U.S. Cl.
CPC .............. *A01D 75/00* (2013.01); *A01B 79/005* (2013.01); *A01D 41/127* (2013.01); *A01D 75/28* (2013.01)

(58) Field of Classification Search
CPC ............... A01B 79/005; A01D 41/127; A01D 41/1274; A01D 41/1276; A01D 69/08; A01D 75/28; A01D 75/00; B60K 31/005; B60K 31/0066; G05D 1/0274; G05D 1/0278
USPC ........... 56/10.2 R, 10.2 A–10.2 G, 11.1, 11.3, 56/11.9; 701/50, 207, 213, 208, 52, 53, 701/56, 93, 58, 68, 65; 342/357, 457, 342/357.06, 357.13, 357.17
See application file for complete search history.

(56) References Cited

U.S. PATENT DOCUMENTS 5,995,895 A    11/1999    Watt et al.

FOREIGN PATENT DOCUMENTS

| DE | 4431824 C1 | 5/1996 |
|---|---|---|
| DE | 10130665 A1 | 1/2003 |
| DE | 102005000770 B3 | 7/2006 |
| DE | 102011007511 A1 | 10/2012 |
| EP | 2401904 A2 | 1/2012 |
| EP | 2165591 B1 | 2/2012 |
| WO | 2008124596 A1 | 10/2008 |

OTHER PUBLICATIONS

European Search Report dated May 13, 2014 (6 pages).

*Primary Examiner* — Robert Pezzuto

(57) ABSTRACT

The automatic adjustment of a combine harvester (10) includes providing an electronic map with characteristics of the field (304), determining a work parameter of the combine harvester (10) by using information provided by the electronic map; and adjusting an actuator (36, 38, 42, 84, 48, 50) of the combine harvester (10) with the aid of the determined work parameter.

10 Claims, 3 Drawing Sheets

METHOD FOR SETTING THE WORK PARAMETERS OF A HARVESTER

The invention relates to a system and method for setting the work parameters of an agricultural harvester.

BACKGROUND OF THE INVENTION

Agricultural harvesters are used to harvest the plants from a field. Processing operations take place in the harvester, so as to handle the crops for the purpose of a later further processing. Thus, the crops are chopped in a field chopper and threshed in a combine thresher, separated, and cleaned. In these processing operations, various work parameters of the harvester are set; with a field chopper, for example, the cutting length and, perhaps, an effective intensity of a conditioning device and with a combine harvester, the threshing drum speed, the threshing slit, the speed of the cleaning blower, and the sieve opening, and with all harvesters, the rate of advance that determines the individual throughput.

For most combine harvesters, basic settings for the work elements such as the threshing element, the residual grain separation, and the cleaning device are proposed as empirical values by the manufacturer. On the basis of the great variation of actual characteristics of the crops, these proposals can only be initial approximations. The only thing the operator still needs to do is to optimize the settings, depending on the available specifications (for example, crops with low losses or in the shortest possible time) and crop conditions, so as to be able to utilize the full performance capacity of the machine. That can take place in a purely manual manner according to its own strategy in a dialogue operation with assistance systems (see EP 2 165 591 A1), or automatically with an automatic adjustment system (EP 2 401 904 A2). A basic problem remains in that the dividing, separating, and cleaning operations in a combine harvester are very complex and their results can be monitored only by a few sensors. Even with so-called anticipatory sensors, no absolute relationship is yet recognizable, initially, to the partial operations in the combine harvester and its results. For this reason, various methods have been proposed in the past for the mathematical modeling of the processes, on whose basis a setting of the function elements can take place (neural networks, fuzzy controllers, regression models, and so forth).

All these models, however, must first be also coordinated with the individual harvesting conditions and goal formulations. They require a certain training phase. Furthermore, the sensors used in these processes must also first be calibrated so as to be able to provide reliable information. Proceeding from the settings found in the training phase, these systems can then compensate for variations in the harvesting conditions to a certain extent by adapting to the machine setting and the traveling speed. If the deviations are excessively large, these systems must also be recoordinated and the sensors must be recalibrated. These training phases and calibration require a certain time period during which the prevailing boundary conditions should be maintained as constant as possible.

The disadvantage exists, moreover, that feedback sensors interact with crops in the harvester, and for that reason, with changes in the characteristics of the gathered crops, reactions come much too late. In the state of the art, therefore, different procedures are described in which the attempt is made so that with an adjustment of the work parameters of the harvester, the characteristics of the crops to be harvested in each case are taken into consideration, in an anticipatory manner, by an automatic control.

In this respect, sensors are used, on the one hand, which, in an anticipatory manner, have a view of the crops from the harvester, so as to determine their characteristics (for example, density, maturity), and so as to change, with the aid of the determined characteristics, work parameters and settings of the harvester, such as the rate of advance (DE 101 30 665 A1).

On the other hand, methods are described in which an electronic map with field characteristics and/or operating data of the harvester is first set up, so as to recall the map data during the harvest in a georeferenced manner and to use them to set up work parameters of the harvester to be adjusted automatically.

DE 44 31 824 C1, for example, proposes that, in a first harvesting operation, the yield data for the grain and straw throughput, grain losses, and adjusted theoretical values of the operating parameters be stored in a map, in a georeferenced manner. In the next harvesting operation, the data from the map are recalled, in an anticipatory and georeferenced manner, so as to derive therefrom the individual working parameters of the harvester. The possibility of inserting a subordinate control loop thereby exists, which is based on a so-called reverse control action for the traveling speed, in which the individual throughputs of the combine harvester are locally recorded and used for the determination of the traveling speed, so as to obtain a constant throughput performance and/or constant settings of the work elements of the combine harvester.

DE 10 2005 000 770 B3 describes a procedure for the automatic control of a combine harvester, in which a theoretical map, which is used for the fundamental control of the combine harvester, is to be set up on the basis of georeferenced data obtained during the biomass development. During the harvesting operation, a regulation of the rate of advance and the setting of the work parameters of the combine harvester take place on the basis of the theoretical map so as to attain an acceptable threshing quality and losses.

With the anticipatory sensors, it has proved problematic to record sufficiently exact data at a distance that extends sufficiently far in front in order to take into account the reaction times of the actuators for the purpose of a prompt change of the work parameters of the combine harvester. Suitable sensors are thus relatively cumbersome and expensive. With the known systems based on georeferenced sensors, there is the problem that the actual harvesting characteristics are not always exactly in agreement with the characteristics predicted from the map, which can lead to inappropriate work parameters for the harvester. The subordinate control with a rear control action in accordance with DE 44 31 824 C1 reduces this problem, however, but there still remain inaccuracies in the data derived only from the map that make a local optimization of work parameters for the harvester and/or a calibration of feedback sensors, in particular the loss sensors, appear to be useful, but which is not provided for in the state of the art.

The goal of the invention under consideration is then seen as providing a system and a method for the automatic setting of processing parameters for an agricultural machine that does not have the aforementioned disadvantages or has them only to a lesser extent.

SUMMARY OF THE INVENTION

In accordance with one aspect of the invention, a method for setting work parameters for a harvester comprises: (a) providing a map with characteristics of a field in an electronic control device of the harvester; (b) deriving at least one work parameter of the harvester in a harvesting operation with the control device, taking into consideration a characteristic of the field, deduced from the electronic map for a harvesting position; (c) adjusting an actuator of the harvester, with the aid of the derived work parameter with the control device; (d) determination of a finely adjusted work parameter with the control device, with the aid of the result of step (b), taking into consideration a measurement value of a result of the harvesting operation that can be influenced by the actuation, determined with a sensor, and/or a connection, determined with the aid of an operator input, between a work parameter determined in step (b) and a work parameter that is to be adjusted, and the repetition of step (c) with the finely adjusted work parameter.

The proposal is made that (e) sections be identified along a path of the harvester, over the field, with the control device with the aid of the electronic map, on which characteristics of the field are homogeneous within predetermined limits and above a threshold value for distances lying above a threshold value for the length, and that (f) calibration data for the sensor and/or parameters for the fine adjustment of the work parameter and/or the operator input for step (d) be determined in the moving and harvesting of at least some sections identified in step (e) and be used in the following steps (d).

In other words, an electronic map is prepared in which characteristics of a field are recorded in a georeferenced manner. These characteristics can be soil characteristics (type of soil, soil moisture), topographical characteristics (height above sea level, angle of tilt, and alignment) and/or information from which the plant density of the field can be derived, such as data regarding the plant and/or usable part throughput from previous harvesting operations or data for the site-specific delivery of fertilizer from points of view of precision agriculture. In this respect, reference is made to the state of the art in accordance with DE 44 31 824 C1 and DE 10 2005 000 770 B3, whose disclosures are hereby fully incorporated in the documents under consideration. This electronic map can be set up on a stationary computer in an office or on a mobile computer or in the electronic control device of the harvester and is loaded, in step (a), in the work storage unit of the control device of the harvester.

In step (b), at least one work parameter of the harvester is derived by the control device during a harvesting operation, taking into consideration a characteristic of the field deduced from the electronic map for a harvesting position. Thus, during the harvesting operation, the position of the harvesting machine is determined, for which reason recourse can be had to a position-determining system, such as GPS, Galileo, Glonass, and/or an inertia measurement device, that makes use of a known satellite-based or earth-bound transmitter. For each position of the field to be processed (preferably in an anticipatory manner, so that upon reaching a certain position, the work parameter has already been correspondingly set), a characteristic of the field is read off the electronic map and, from that, an appropriate adjustment of a work parameter for the harvester is derived: in step (c), this work parameter is then adjusted with the control device, and for this reason, a suitable control signal is sent to an actuator of the harvester.

Since the electronic map does not reflect reality with sufficient precision in all cases, a fine adjustment of the work parameter determined in step (b) is carried out in step (d). A regulation of the work parameter can be carried out with the control device, which has recourse, as the feedback value, to a measurement value of a result of the harvesting operation that can be influenced by the actuator, as recorded with a sensor. Alternatively or additionally, the control device can undertake the fine adjustment in step (d) with the aid of a connection, determined on the basis of an operator input, between a work parameter determined in step (b) and a work parameter to be adjusted. Thus, one considers an operator input from which is derived a change (absolute or relative) of the work parameter determined in step (b). The operator input can, for example, state that the rate of advance or any arbitrary work parameter should be higher by a certain percentage than that determined in step (b). Step (c) is repeated with the now finely adjusted work parameter (regulated with the aid of the feedback value of the sensor or the operator input). Future passages through step (c), based only on the values from the electronic map, are omitted as soon as sufficient data for step (d) are available. The actuators are then adjusted only on the basis of the result of step (d).

Thus, for example, if the actuator controls the rate of advance and the sensor records the throughput in the harvester, for example, by measuring a driving force of a feed conveyor or a threshing drum, an expected throughput, determined in step (b) during the determination of the rate of advance, as the theoretical value to be attained, is compared to the actual throughput, and the advance rate is raised or lowered as compensation in the case of a deviation so as to obtain a desired theoretical value of the throughput. Analogously, the rate of advance is increased by the aforementioned percentage if the operator input is taken into consideration. In this case, there need not be recourse to sensors, but rather one obtains an open regulation loop whose theoretical value is corrected by the operator input.

However, since the sensors may work with insufficient precision and agricultural harvesters, in particular, combine harvesters, are complex systems that react in a relatively sensitive manner to harvesting conditions, the invention under consideration proposes that the control device identify, in one step (e), with the aid of the electronic map, sections along a path of the harvester over the field on which characteristics of the field are homogeneous within prespecified limits and over distances along that length that lie above a threshold value. Accordingly, sufficiently long partial distances of a path of the harvester to be traversed over the field are identified on which one or more characteristics are sufficiently similar or the same. Accordingly, these partial sections are particularly suitable for determining, in one step (f), calibration data for the sensor and/or parameters for the fine adjustment of the work parameter and/or the aforementioned operator input. These calibration data and/or parameters and/or operator input is/are determined during the traveling and harvesting of some sections that are to be identified in step (e) and used in the following steps (d).

An advantage of the use of georeferenced electronic maps is the possibility of estimating in advance the related size of areas with almost similar characteristics, and the limits of these areas. That makes possible a clear improvement of the dynamics and stability of control circuits. Thus, related large areas can be utilized, so as to calibrate sensors that coordinate the control models to the real conditions, or that undertake an adjustment optimization for this area. With smaller areas, the decision can be made, according to the control task, as to whether this area should be ignored (filtered) or whether an even more aggressive regulation must take place. In a similar manner, an anticipatory estimate can be carried out as to whether the transitions between various areas are more flowing or sharper, so that, likewise, the dynamics of the regulation can be correspondingly adapted there.

It is not the overriding goal of the invention to immediately derive direct indications from the electronic map data for the optimal adjustment of the machine. Rather, the areas with the same or similar characteristics and their limits are to be recognized. For the individual areas, an optimization by an internal control loop initially takes place. These found values can then be used to "train" the electronic map in a known manner. Another advantage is that a learning-capable, georeferenced electronic map can be built up as a framework for various control tasks in which the development expense is reduced.

In this way, the electronic map is not only used for the (anticipatory) adjustment of the work parameter of the harvester, but rather it is also used to identify sections of the harvesting path on which calibration data are determined for the sensor and/or parameters for the fine adjustment of the work parameter and/or the operator input, which are subsequently used for the automatic, precise fine adjustment of the work parameter.

In step (f), the calibration data and/or parameters for the fine adjustment of the work parameter for step (d) can be determined by an operator and input into the control device or can be automatically determined by the control device.

The work parameter can be, for example, the rate of advance of the harvester, a threshing device adjustment (rpm, threshing slit), a cleaning adjustment (blower rpm, sieve opening, the sieve vibration frequency) and/or a cutting mechanism adjustment (height, side tilt).

The sensor can be, for example, a grain loss sensor and/or a throughput sensor.

As described above, in step (d), differences can exist between a theoretical value for a work parameter derived only from the electronic map in step (b) and a measurement value determined by means of a sensor, which lead to the subsequent regulation of the work parameter. These differences can also be used to update the characteristics recorded in the electronic map and/or the pertinent position.

The parameters for the fine adjustment of the work parameter determined in step (f) can concern variables of mathematical models or of machine learning algorithms and/or the selection of a control strategy.

In step (d), there is the possibility that the electronic control device additionally takes into consideration the measurement value of an anticipatory crop sensor, for example, a camera, a radar sensor, or a laser scanner.

In order to avoid unnecessary adjustments of the actuator, in step (b), the control device can ignore changes of the characteristics of the field in the electronic map, if they are valid only over distances that fall short of a minimum value.

BRIEF DESCRIPTION OF THE DRAWINGS

In the drawings, an embodiment example of the invention, described in more detail, is shown below.

DETAILED DESCRIPTION OF THE PREFERRED EMBODIMENTS

Figure 1:
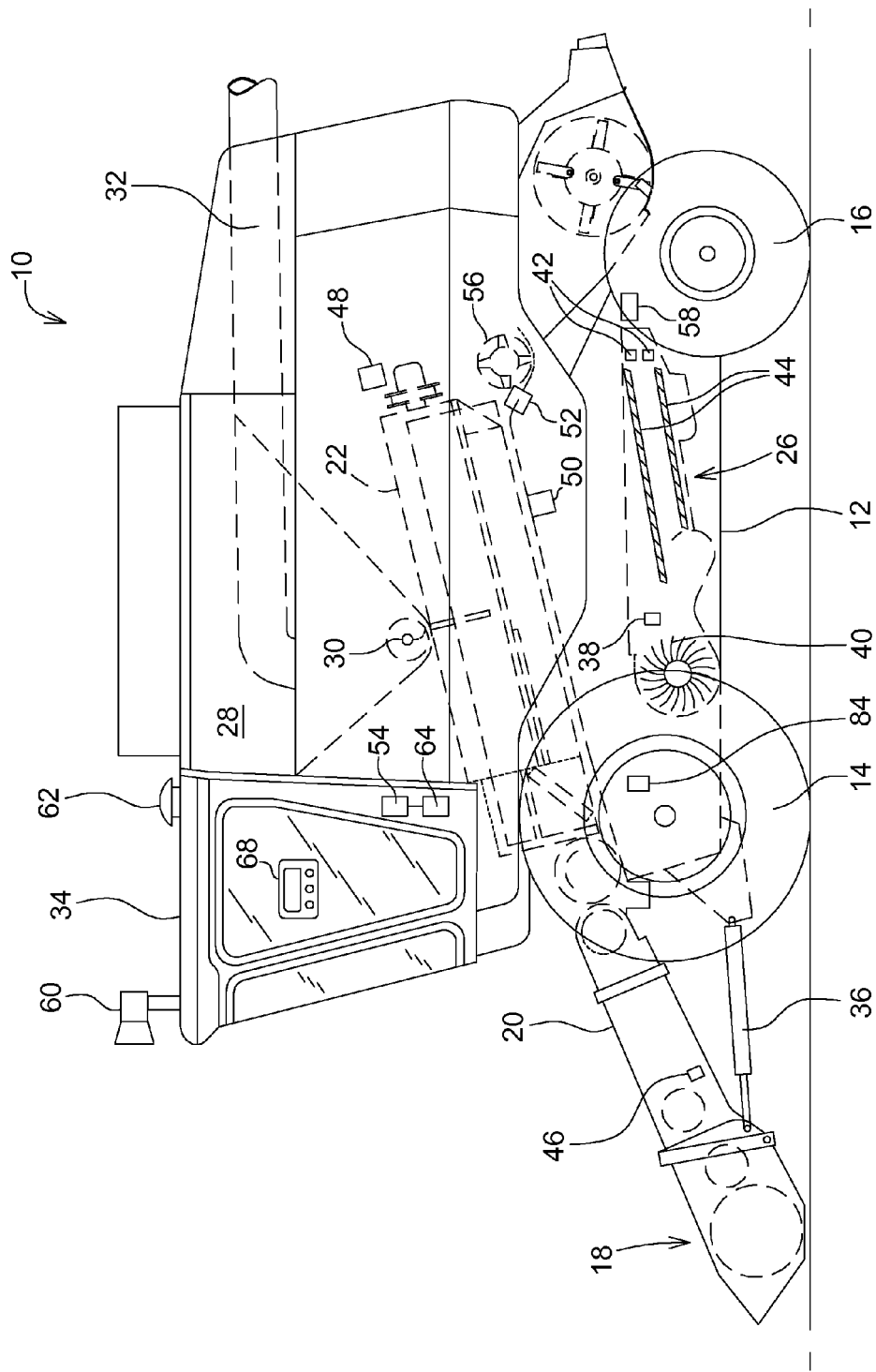
FIG. 1 is a schematic side view of an agricultural harvester, in the form of a combine harvester.

FIG. 1 shows a self-propelled harvester, in the form of a combine harvester 10, with a chassis 12, which is supported on the ground via front wheels 14 that are driven and rear wheels 16 that are steerable, and is moved forward by them. The front wheels 14 and the rear wheels 16 are turned by means of driving means, not shown, so as to move the combine harvester 10, for example, over a field that is to be harvested. Below, direction indications, such as forward and backward, refer to the direction of travel V of the combine harvester 10 in a harvesting operation, which moves to the left in FIG. 1.

A harvesting attachment 18, in the form of a cutting mechanism, is connected in a detachable manner to the front end area of the combine harvester 10 so as to harvest crops in the form of cereals or other threshable corn from the field during the harvesting operation, and to conduct them upward and backward through an inclined conveying assembly 20 to an axial threshing element 22. The mixture containing grain and impurities, which passes through threshing baskets and grids in the axial threshing element 22, arrives at a cleaning device 26. Cereal that has been cleaned through the cleaning device 26 is conducted to a grain elevator by means of a grain auger; the elevator conveys it to a grain tank 28. The cleaned cereal from the grain tank 28 can be unloaded by an unloading system with a cross auger 30 and an unloading conveyor 32. The aforementioned systems are driven by means of a combustion engine and are controlled and steered by an operation from a driver's cabin 34.

An electronic control device 54 controls (via valves that are not depicted) the position of an actuator 36 to change the height of the harvesting attachment 18 above the ground, controls the position of an actuator 38 to adjust the rpm of a blower 40 of the cleaning device 26, controls the position of two actuators 42 to adjust the opening width of sieves 44 of the cleaning device 26 and controls an actuator 84 to specify the rate of advance of the combine harvester 10. Another actuator (not shown), that is controlled by the electronic control device 54, could specify the height of a reel of the harvesting attachment 18. Furthermore, an actuator 48 controls the rpm of the axial threshing element 22 and an actuator 50 adjusts the position of the threshing basket so as to adjust the size of the threshing slit. The aforementioned actuators 36, 38, 42, 84, 48, 50 are adjusted by the control device.

A throughput sensor 46 records the throughput in the inclined conveying assembly 20, for example, with the aid of a driving torque of a chain conveyor of the inclined conveyor. A first grain loss sensor 52 records the quantity of the lost grains in the crop residue flow that is released by the axial threshing element 22 and is discharged through an ejection drum and, directly or via a straw chopper (not depicted), to the rear of the combine harvester 10, onto the field. A second grain loss sensor 58 records the quantity of the lost grain in the crop residue flow that is released by the upper sieve of the cleaning device 26 and is discharged through the aforementioned straw chopper or a separate chaff distributor onto the field. The sensors 46, 52, and 58 are connected by means of a transmission of signals to the electronic control device 54.

The electronic control device 54 is also connected to a storage device 64, a position determining device 62, in the form of an antenna to receive signals from a satellite-based position determining system, and to an operator interface 68 with input means (buttons) and a display.

Figure 2:
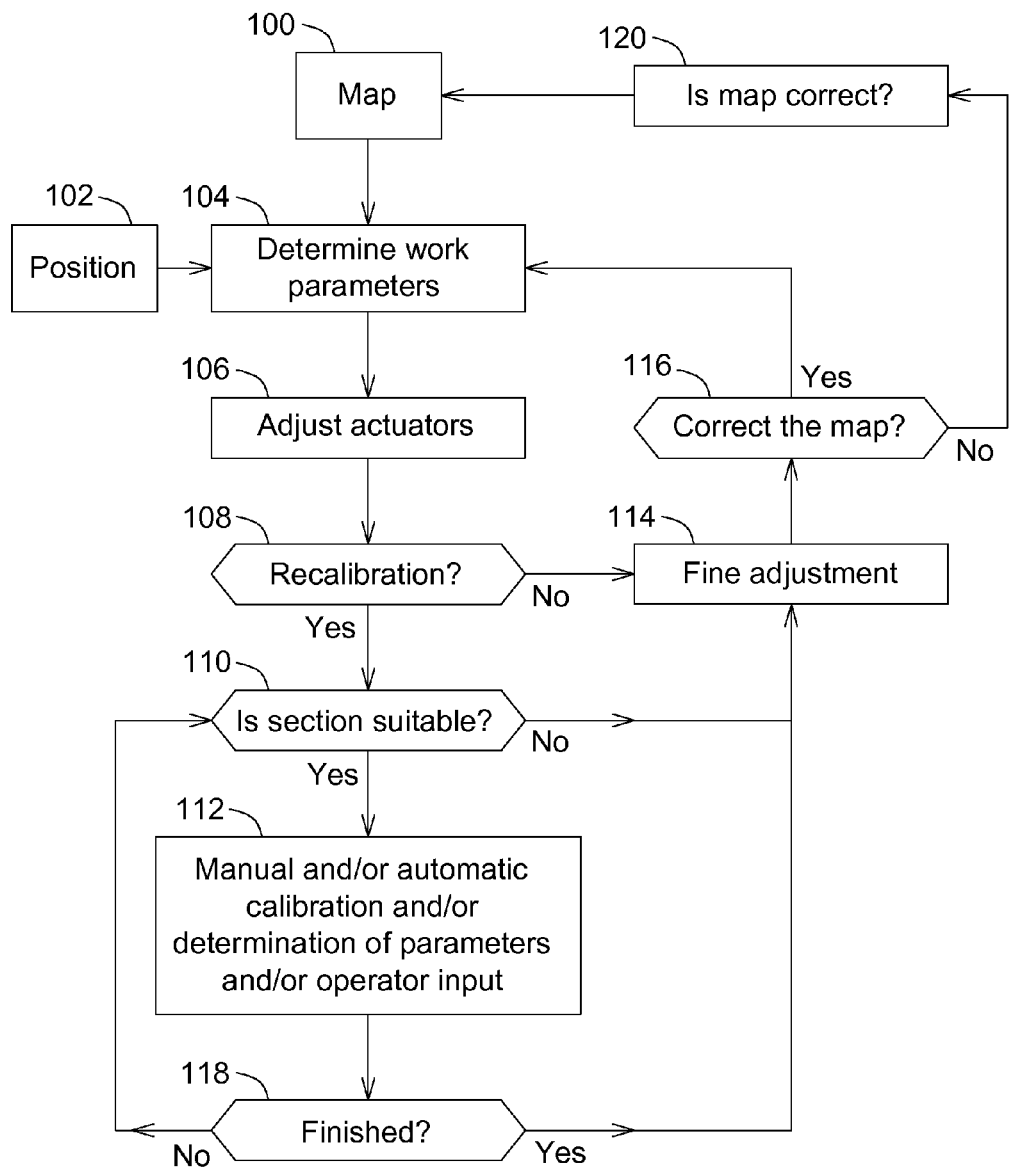
FIG. 2 is a flow chart that shows how a control device of the harvester of FIG. 1 works.
Figure 3:
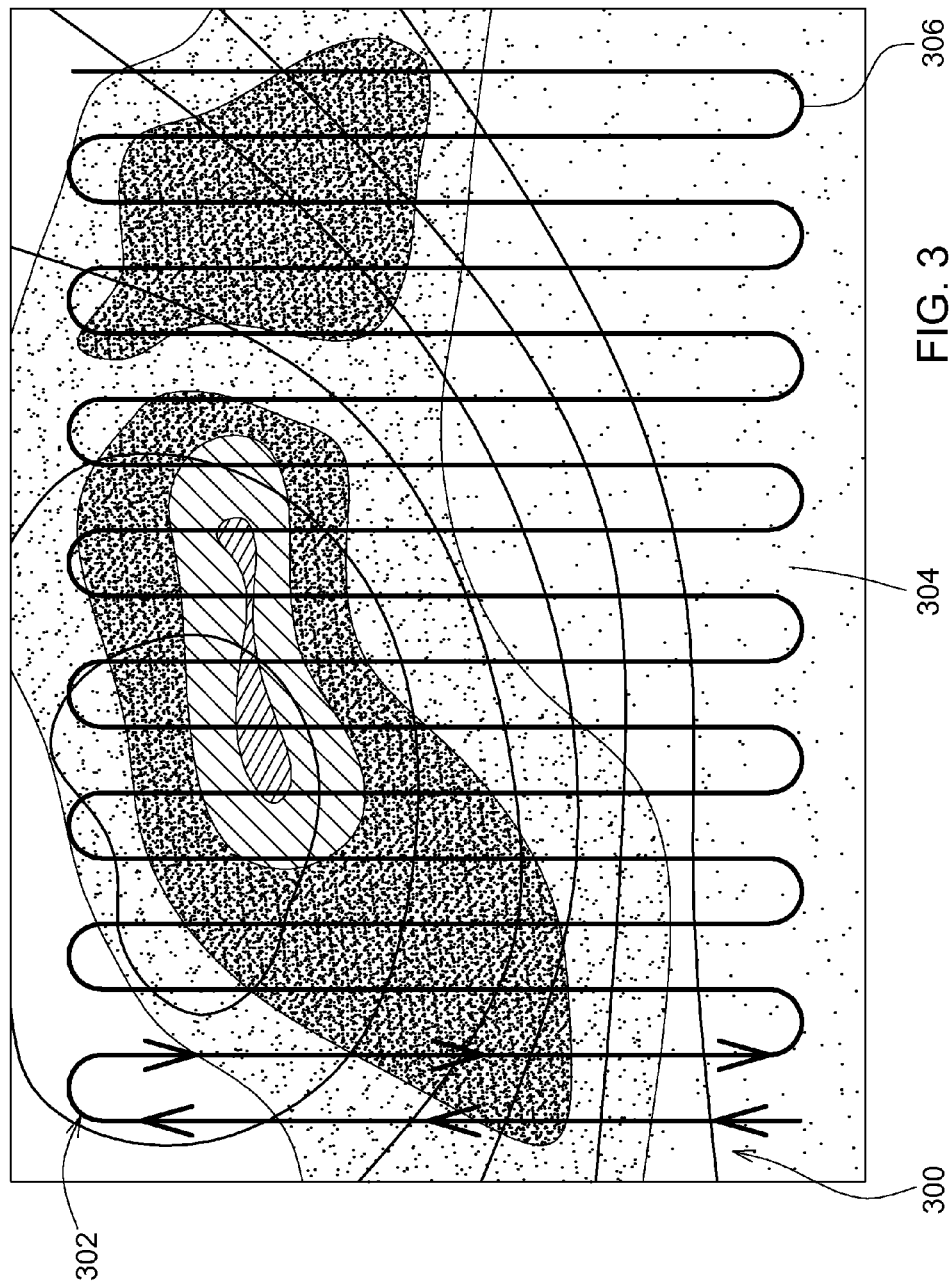
FIG. 3 is an example of an electronic map that is used by the control device of the harvester.

FIG. 2 shows a flow chart that shows how the electronic control device 54 of the combine harvester 10 proceeds while harvesting a field. In step 100, an electronic map for the pertinent field is loaded into the storage device 64. In this electronic map, georeferenced data for characteristics of the field are stored. An example of such an electronic map is shown in FIG. 3. It contains position-referenced characteristics of the field 304, in which, for example, we are dealing with the type of soil and/or the yield measured in the last harvest. These characteristics are classified in a total of 6 classes in the electronic map shown. Furthermore, the electronic map contains topographical data of the field 304 (height data or height lines 300). This electronic map can be produced during the previous harvest by the combine harvester 10, with the aid of data of the throughput sensor 46 and (three-dimensional) position data, by the position determining device 62 itself and remain after that in the storage device 64, or it can have been transmitted by a computer, wirelessly (via a radio connection) or via a storage electronic map, into the storage device 64 in an arbitrary manner (for example, from another combine harvester or with the aid of aerial photographs or by a reconnaissance flight or aircraft, or with the aid of data for the precision-agricultural cultivation of the field) by an external computer.

In addition, a planned path 302 that the combine harvester 10 will traverse during the harvesting on the field 304 is stored in the storage device 64. In this respect, reference can be made to known routing procedures.

In step 104, the electronic control device 54 determines the actual position of the combine harvester 10, with the aid of the signal of the position determining device (step 102) and derives from that a position that the combine harvester 10 will reach in a predetermined time (for example, in 2 seconds). This anticipatory procedure is advantageous because of the reaction times of the actuators 36, 38, 42, 84, 48, 50. With the aid of the determined position, the electronic control device 54 deduces the pertinent characteristic of the field 304 from the electronic map, and from that, derives suitable work parameters of the combine harvester 10 and, derived from that, adjustment values for the actuators 36, 38, 42, 84, 48, 50. For example, with the aid of a crop density that is stored in the electronic map, an expected throughput is calculated as the work parameter, and from that, the rate of advance of the combine harvester 10 is derived for the purpose of controlling the actuator 84. In an analogous manner, the adjustments of the other actuators 38, 42, 84, 48, 50 can be determined. The steps 100 and 102 for the georeferenced preparation of the data from the electronic map (and perhaps the derivation of the work parameter in step 104), on the one hand, and the determination of the adjustment values for the actuators 36, 38, 42, 84, 48, 50 in steps 104, 106, and 116, on the other hand, can take place in various processes (or processors) of the electronic control device 54.

The adjustment of the actuator 36 and perhaps a (not shown) actuator for the adjustment of the side tilt of the harvesting attachment 18 and/or perhaps, separately, for the compensation for a side slope of front wheels 14 that are height-adjustable is determined with the aid of the topographical data of the electronic map (see WO 2008/088916 A1). From the values derived from the topographical data for a side tilt of the combine harvester 10 on the side slope and/or a tilt of the combine harvester 10 in the forward direction, signals for the adjustment of the actuators 42 for the adjustment of the sieve opening can also be derived.

The steering of the combine harvester 10 during the harvesting operation is carried out manually by the operator of the combine harvester with the aid of the path 302 that is stored in the electronic map and the starting signal of the position determining device 62, either automatically by means of a steering actuator (not depicted) for the adjustment of the steering angle of the rear wheels 16 or a display on the operator interface 68.

In step 106, the individual work parameters or the adjustment values derived from them by the electronic control device 54 are transmitted to the actuators 36, 38, 42, 84, 48, 50, so that they automatically arrive at the position determined, in each case, by the electronic control device 54.

Step 108 follows, where the query is made whether a recalibration of the electronic control device 54 is required or useful. Such a recalibration is particularly suitable if the combine harvester 10 reassumes its work (in the morning), when a field with a crop different from the previous one will be harvested or if a certain time has elapsed since the last recalibration, since crop characteristics change over the progressing time of day, in particular when exposed to sunlight. The recalibration is used to provide a fine adjustment of the combine harvester 10 so as to be able to adapt the work parameters stipulated in step 104 even more precisely to the individual conditions.

If a determination is made in step 108 that a recalibration is not required, then step 114, which is explained in detail further below, follows. Otherwise, step 110 follows, in which the electronic control device 54 tests whether the partial section of the path 302, traversed in the following, has a sufficiently long distance (lying above a threshold value of, for example, 100 m) that has, within limits, a constant characteristic, preferably including the topography. This ensures that during step 112 that may follow, sufficiently homogeneous conditions prevail, so as to attain reproducible results and thus suitable data for the fine adjustment. The topography can hereby also be taken into consideration, since the crops surely have different characteristics on north slopes than on south slopes. If the section is not suitable, then step 114 follows, otherwise, step 112.

In step 112, then, the aforementioned data are obtained for the fine adjustment. For the purpose, the combine harvester 10 is first moved over the field at a predetermined speed or a speed leading to a certain throughput (sensor 46), preferably over partial stretches of the path 302 that was completely identified in step 110, or a part thereof. After the processing operation in the combine harvester 10 has stabilized, a calibration of the grain loss sensors 52 and/or 58 can, for example, take place, either with a loss testing bowl (see DE 101 50 080 A1) or a count of the grains behind the combine harvester 10 by the operator or by means of an image processing system (DE 10 2012 223 434 A1, whose disclosure is incorporated in the documents under consideration by reference).

Alternatively or additionally, the operator can examine one or more results of the work process, such as the purity of the grain in the grain tank 28 or the composition of the returns, and by means of the operator interface 68, give corresponding inputs to the electronic control device 54. In this respect, reference is made to the disclosures of EP 1 297 733 A1 and EP 1 371 278 A1. The electronic control device 54 then derives a new connection between the characteristic of the field, known from the electronic map, and the work parameter, which is used later in step 114. There is also the possibility that the operator simply inputs an additive correction value or multiplicative correction factor if he is not satisfied with a specification of the control unit for a work parameter. Thus, the operator can raise or lower, by means of the operator interface 68, for example, the rate of advance or the adjustment value for one of the other actuators 36, 38, 42, 48, 50 by a few percent or by concrete absolute values if the throughput or another result of the work process does not correspond to his expectations. Finally, step 112 can also be based exclusively on data obtained by the electronic control device 54, in that it uses sensor values to adjust one or more work parameters more precisely. Thus, for example, the broken grains in the grain elevator can be determined by means of a camera or a UV sensor and can be used for the determination of a new connection between the characteristic of the field, known from the electronic map, and the work parameter (here: threshing element rpm and slit).

The data obtained in step 114 for the fine adjustment can also concern variables of mathematical models for the regulation of work parameters, for example, a mathematical model for the adjustment of the actuators 38, 42 for the cleaning device 26. There is also the possibility that the aforesaid data concern variables of machine learning algorithms, for example, of neural networks and/or the selection of a control strategy—that is, for example, a switch between the throughput regulation and a loss-based regulation.

In step 118, the query is then made whether step 112 has concluded—that is, a sufficient number of data were obtained for the fine adjustment. There is then the possibility of repeating step 112 on another path section on which the same or other characteristics of the field are valid. If other characteristics are valid, the possibility exists of obtaining a second set of data for the fine adjustment for these characteristics that can be correlated with these other characteristics. Data for the adjustment with intermediate values of the characteristics can then be produced, immediately or later, by interpolation. If the result of step 118 is that finding the data for the fine adjustment has not yet been concluded, then step 110 follows, once more, otherwise, step 114.

In step 114, there is a fine adjustment of the work parameters that were previously determined in step 104 with the aid of the electronic map. Initially (if the recalibration of steps 108 to 112 has not yet been carried out for the determination of the data for the fine adjustment), the data from step 104 are simply used. After the end of the recalibration, on the other hand, the data for the fine adjustment from steps 108 to 112 are used so as to find, with the aid of the work parameters from step 104 and the data for the fine adjustment, an improved determination of the work parameters and to transmit them or the adjustment values derived from them to the actuators 36, 38, 42, 84, 48, 50. Accordingly, in step 114, the starting values of the grain loss sensors 52, 58 can be improved with the aid of the calibration values found and can be used for the automatic regulation of work parameters of the combine harvester 10. Analogously, values of the throughput sensor 46 can be calibrated and thus be more precisely recorded. As described above, the connections between the characteristics of the field 304 in the electronic map, also determined in step 112, and the optimized work parameters to be adjusted can also be used for the adjustment of the actuators 36, 38, 42, 84, 48, 50. The now attained adjustments are more precise than the adjustments based on step 104 and lead to better work results.

In step 116, the query is subsequently made whether the electronic map is sufficiently precise. If there are no greater deviations between the work parameters from step 104 and the work parameters from step 114, the electronic map is sufficiently precise and step 104 again follows in order to determine one or more work parameters for the next position of the combine harvester 10 along the path 302. Step 106 is thereby skipped over after the end of the recalibration, because the finely adjusted work parameters are directly adjusted in step 114.

If, on the other hand, step 116 shows that the electronic map is not sufficiently correct, the electronic map is corrected in step 120. Thus, for example, a more imprecise throughput value in the electronic map can be replaced by a throughput value recorded by means of the throughput sensor 46, or an average value from a throughput obtained in the electronic map and recorded by the throughput sensor 46 is input. There is also the possibility of shifting limits between adjacent classes, if, with the aid of values of a sensor or the position determining device 62, they have not proved correct. Again, step 104 follows step 120 (with a changed electronic map, step 100).

During steps 104 to 114, information regarding the steps carried out individually by the electronic control device 54 is displayed to the operator on the operator interface 68 by the electronic control device 54. Furthermore, if it is useful, instructions regarding the steps to be carried out by him are displayed to the operator—for example, if he is to count the number of lost grains on a specific area and he is to input it in the electronic control device 54 via the operator interface 68. If necessary, the combine harvester 10 can stop automatically to make it possible for the operator to carry out required actions that are displayed to the operator on the display unit of the operator interface 68. In addition, the electronic map can be displayed on the display unit of the operator interface 68, analogous to the representation in FIG. 3, wherein the individual position of the combine harvester 10, the path to be traversed 302, and the corresponding classification and actions to be carried out while traversing the path (calibration, etc.) can be particularly stressed. Also, adjustments for the actuators 36, 38, 42, 84, 48, 50 selected from the electronic control device 54, values derived from signals of the sensors 46, 52, 58, and/or arbitrary work parameters of the combine harvester 10 can be displayed on the display unit of the operator interface 68 by the electronic map.

What remains to be noted is that various modifications of the method in accordance with the invention are conceivable. Thus, after a recalibration, steps 106, 108, 114, and 116 are skipped over if the change of the adjustment would take place only over a relatively short distance that lies below a threshold value, such as on the lower right edge of the electronic map of FIG. 3 with the turning loops 306 in the headland. Furthermore, in steps 104 and/or 114, the starting signal of an anticipatory sensor 60, which can be a camera for the recording of the plant density ahead of the combine harvester 10, can be used for the production of more precise work parameters, so as to compensate for stochastic variables which could not be foreseen with the aid of the electronic map, such as damage caused by game, destruction by insects, or stored cereals.

The invention claimed is:
1. A method for adjusting work parameters of a combine harvester (10) comprising steps of:
  (a) providing an electronic map with characteristics of a field (304) in an electronic control device (54) of the combine harvester (10);
  (b) deriving a desired value of at least one work parameter of the combine harvester (10) in a harvesting operation by the electronic control device (54), taking into consideration a characteristic of the field (304) taken from the electronic map for a harvesting position;
  (c) adjusting at least one of a cutting height adjustment actuator (36), a blower speed actuator (38), sieve opening actuators (42), a rate of advance actuator (84), a threshing element rpm actuator 48 and a threshing slit adjustment actuator (50) of the combine harvester (10) coupled for influencing a measurement value of said at least one work parameter, with the aid of the derived desired value of the at least one work parameter, by the electronic control device (54);
  (d) determining a finely adjusted work parameter value by the electronic control device (54), taking into consideration the desired value derived in step (b) and taking into consideration a measured feedback value of the at least one work parameter using at least one of a throughput sensor (46), a first grain loss sensor 52 and a second grain loss sensor (58), with the finely adjusted feedback value being influenced by the at least one actuator (36, 38, 42, 84, 48, or 50) and a repetition of step (c) with the finely adjusted work parameter value; characterized in the steps of:

(e) identifying sections along a path (302) of the combine harvester (10) over the field (304) in which characteristics of the field (304) are homogeneous, within predetermined limits and distances that lie above a threshold value for the length, as determined by the electronic device (54) with the aid of the electronic map; and (f) determining at least one of calibration data for the at least one of the throughput sensor (46), the first grain loss sensor 52 and the second grain loss sensor (58) or parameters for a further fine adjustment of the desired work parameter value for step (d) when travelling over and harvesting at least some stretches identified in step (e), with the further fine adjustment of the desired work parameter value being used in subsequent steps (d).

2. The method of claim 1, wherein, in step (f), the at least one of the calibration data or parameters is determined for the further fine adjustment of the work parameter for step (d) by one of an operator, who inputs the at least one of the calibration data or parameters into the electronic control device (54), or by the electronic control device (54).

3. The method of claim 1, wherein the at least one desired work parameter value is at least one of a rate of advance of the combine harvester (10), a threshing element adjustment, a cleaning sieve adjustment or a cutting mechanism adjustment.

4. The method of claim 1, wherein the at least one sensor is one of the first grain loss sensor (52), the second grain loss sensor (58) and the throughput sensor (46).

5. The method of claim 1, wherein the characteristics of the field (304) stored in the electronic map contain information regarding at least one of soil characteristics, a topography of the field and a plant density.

6. The method of claim 1, wherein the measured feedback value from step (d) is used to update the characteristics of a field recorded in the electronic map at a pertinent position along a programmed path contained in the electronic map.

7. The method of claim 1, wherein the parameters determined in step (f) are at least one of variables of mathematical models or variables of machine learning algorithms that concern a selection of a control strategy.

8. The method of claim 5, wherein the electronic map contains information regarding plant density and wherein the electronic control device (54) in step (d) also takes into consideration the measurement value of an anticipatory crop sensor (60), which measures an anticipated plant density and compares this sensed plant density with the plant density stored in the electronic map at a field location correlated with that from which the crop sensor is gathering the anticipatory crop density and may use this information for making adjustments to the at least one desired work parameter value.

9. The method of claim 8, wherein the electronic control device (54) in step (b) ignores changes of the characteristics of the field in the electronic map if they are valid only over distances that fall short of a preselected minimum value.

10. A combine harvester (10) including a mobile chassis (12) supported on front drive wheels (14) together with a rate of advance actuator (84) and rear wheels (16), and carrying a combine position determining device (62), an anticipatory sensor (60), an axial threshing element (22) together with an rpm actuator (48), a threshing slit adjustment actuator (50) and a first grain loss sensor (52), a conveying assembly 20 together with a throughput sensor (46) being mounted to a forward end of the mobile chassis (12) for conveying harvested crop to the threshing element (22), a harvesting attachment (18) being attached to the conveying assembly (20) for vertical adjustment by a cutting height adjustment actuator (36), a grain cleaning device (26) including a blower (40) together with a blower speed actuator (38) and sieves (44) together with sieve opening actuators (42) and a second grain loss sensor (58), and an electronic control device (54) being connected to at least one of the cutting height adjustment actuator (36), the blower speed actuator (38), the sieve opening actuators (42), the rate of advance actuator (84), the threshing element rpm actuator 48 and the threshing slit adjustment actuator (50), by means of which a result of the harvesting operation can be influenced, and with at least one of a throughput sensor (46), a first grain loss sensor (52) and a second grain loss sensor (58) for the recording of a measurement value of a result of the harvesting operation, which can be influenced by the at least one actuator (36, 38, 42, 84, 48 or 50), wherein the electronic control device (54) is designed to carry out the method in accordance with claim 1.

* * * * *